United States Patent Office 3,405,574
Patented Oct. 15, 1968

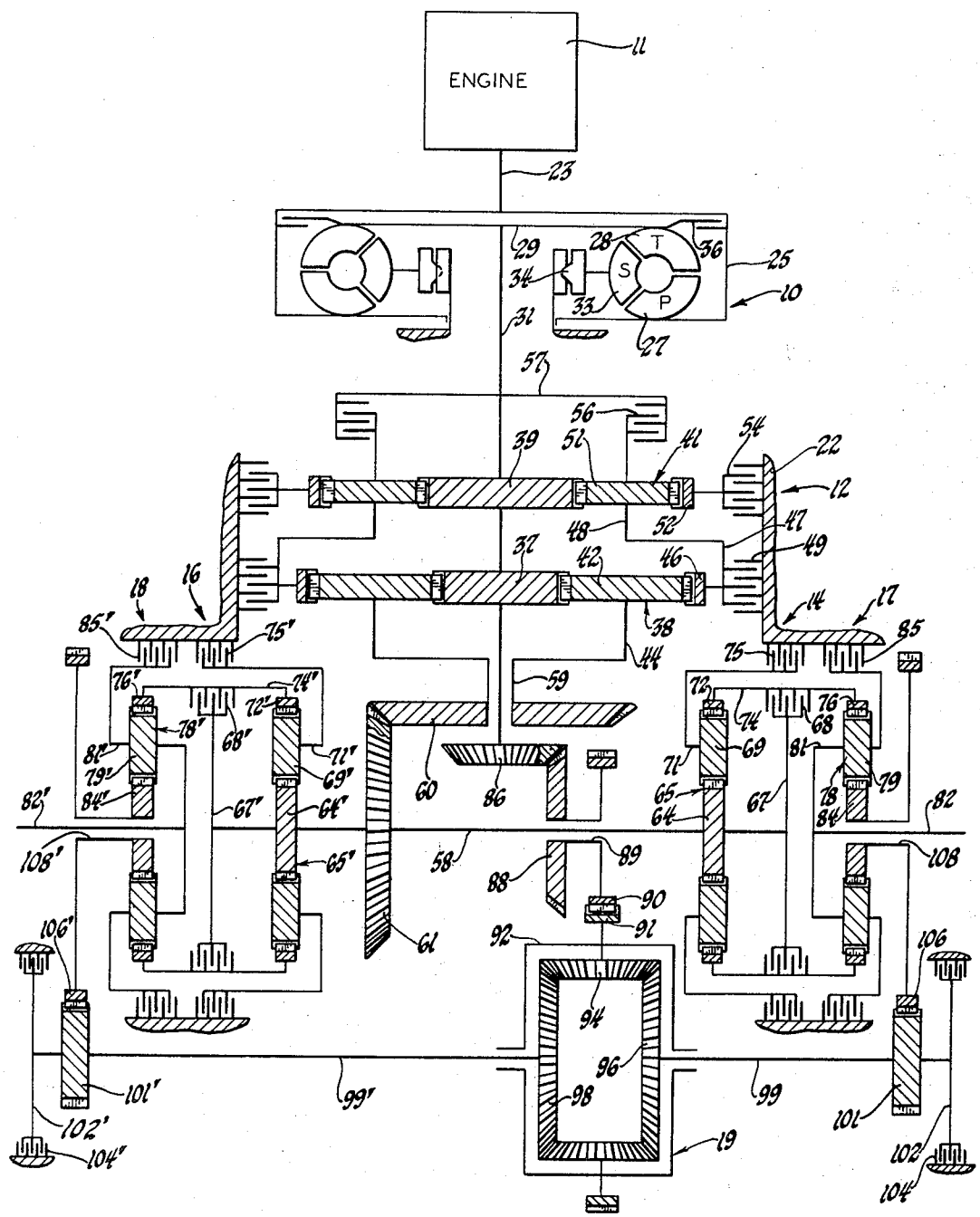

3,405,574
POWER TRAIN
William G. Livezey, Indianapolis, Ind., assignor to General Motors Corporation, Detroit, Mich., a corporation of Delaware
Filed July 18, 1966, Ser. No. 565,821
8 Claims. (Cl. 74—720.5)

ABSTRACT OF THE DISCLOSURE

A power train for use in tracklaying vehicles is disclosed. In the preferred embodiment the power train comprises a hydrodynamic torque converter driven multispeed range unit drivingly connected by a pair of like forward and reverse drive units to a pair of like output combining units respectively. A second input to each output combining unit is through a converter driven differential drive unit. The pairs of forward and reverse drives are combined with the differential drive to provide two forward and reverse output drives for straight, forward-reverse drive propulsion. The forward and reverse drive units are also operable to establish differential output speed in each propulsion drive range for a main steer bias with braking of the differential drives providing additional steer bias.

---

This invention relates to power trains and more particularly to a single-input, dual-output power train providing a plurality of forward and reverse drives and steer systems.

The preferred embodiment of the power train constructed according to this invention is particularly suitable for use in amphibious vehicles of the tracklaying type. The power train generally comprises a converter driven multispeed range unit providing a common input to two like forward and reverse drive units which provide individual inputs to two like output combining units. Another input to the output combining units is provided by a converter driven differential drive unit whereby the differential drive cooperates with the forward and reverse drives for straight, forward-reverse vehicle propulsion. In addition, the differential drive outputs are selectively held to provide a differential type steer control of the power train outputs.

The power train provides three forward and three reverse straight vehicle motion drives on selective establishment of the forward and reverse drives and selective establishment of the speed ratio drives in the range unit. For land operation, the differential outputs are selectively held to increase the speed of one power train output and decrease the speed of the other power train output by a like amount, and this differential steer system is available to be used in all forward and reverse straight vehicle motion drive ranges. For water operation and in all straight vehicle drive ranges, the forward and reverse drives to the output combining units may be used to establish a differential output speed to provide a main steer bias with selective holding of the differential outputs adding to the control of the differential speed of the power train outputs.

An object of this invention is to provide a single-input, dual-output power train providing two individual forward and reverse drives which are combined with a differential drive to provide equal forward and reverse drive ranges for the outputs, and with the forward and reverse drives establishing a differential output speed in each drive range and the differential drive also establishing a differential output speed in each drive range.

Another object of this invention is to provide a power train providing individual and selective forward and reverse drives between a converter driven multispeed unit and each one of two output shafts, a common differential drive between the converter and both output shafts and a combining drive combining the forward and reverse drive and the differential drive to drive each output shaft.

These and other objects of the invention will be more apparent from the following description and drawing of the preferred embodiment of the invention.

The drawing diagrammatically shows the preferred embodiment of the power train.

The vehicular power train generally comprises a torque converter 10 powered by an engine 11, a three-speed unidirectional range unit 12, a pair of like forward and reverse drive units 14 and 16, a pair of like output combining units 17 and 18, and a differential drive unit 19. The converter 10 and range unit 12 are coaxially arranged for location longitudinally of the vehicle, and the units 14, 16, 17 and 18 are coaxially arranged for location transversely of the vehicle. The central axis of unit 19 is offset from and parallel to the axes of units 14, 16, 17 and 18. All units are supported in a power train housing 22.

Describing the power train components in detail, power train input is received and transmitted by the engine shaft 23 which is connected by rotatable converter housing 25 to drive the pump element 27 of torque converter 10. The pump element 27 drives turbine element 28 which is connected by hub 29 to converter output shaft 31. The three converter elements are of conventional type and fluid is circulated toroidally in the converter fluid circuit. As the fluid leaves the turbine element, it is re-directed to the pump element by stator element 33 which is connected by the one-way brake 34 to the transmission housing.

A converter lockup clutch 36 is operable to prevent relative rotation between engine shaft 23 and converter output shaft 31 to provide a direct mechanical drive bypassing the hydraulic drive.

The converter output shaft 31, which transmits converter output to the three-speed range unit 12, is connected to drive sun gear 37 of planetary gear set 38 and sun gear 39 of planetary gear set 41. Sun gear 37 meshes with a plurality of planetary pinions 42 journaled on an output carrier 44. Ring gear 46 meshes with pinions 42 and is connected by drum 47 to the planet carrier 48 of gear set 41 and to a low friction brake 49 which, when engaged, retards the ring gear 46 to provide a low speed ratio drive to output carrier 44. Sun gear 39 meshes with a plurality of planetary pinions 51 journaled on planet carrier 48. Ring gear 52 meshes with pinions 51 and is connected to an intermediate friction brake 54 which, when engaged, retards the ring gear to provide an intermediate speed ratio drive to output carrier 44 by compound action with gear set 38. Planet carrier 48 may be connected by a direct drive or high friction clutch 56 to a hub 57 connected to the converter output shaft 31 to provide a 1:1 speed ratio drive between the converter output shaft and the output carrier 44.

Output from the three-speed range unit 12 is transmitted to a cross shaft 58 serving both forward and reverse drive units 14 and 16 via the output planet carrier 44 which is connected by a sleeve shaft 59 surrounding converter output shaft 31. Shaft 59 is connected to a bevel gear 60 meshing with a driven bevel gear 61 connected to the cross shaft 58. The cross shaft 58 is connected at opposite ends to the right hand forward and reverse drive unit 14 and the left hand forward and reverse drive unit 16. Since the drive units 14 and 16 are identical, like reference numerals are employed for identifying corresponding parts, with the numerals identifying the left hand drive unit 16 being primed. This being the case, only the right hand drive unit 14 will be described in detail, and it will be understood that this description also applies to the left hand drive unit 16.

The cross shaft 58 is connected to a reverse sun gear 64 of a reverse planetary gear set 65 and to the driving hub 67 of a forward drive friction clutch 68. A plurality of planetary pinions 69 mesh with sun gear 64 and are journaled on a carrier 71. A ring gear 72 meshes with pinions 69 and is connected to an output drum 74. The forward drive clutch 68, when engaged, connects the hub 67 to drum 74 to provide a direct or forward speed ratio drive from cross shaft 58 to the output drum 74. A reverse brake 75 connected to carrier 71, when engaged, retards the carrier 71 to establish a reverse speed ratio drive from the cross shaft 58 to the output drum 74.

The output combining units 17 and 18 combine their respective input drive from the differential drive unit 19, as discussed in greater detail later, and their respective input drive from the forward and reverse drive units. Since the output combining units 17 and 18 are identical, like reference numerals are employed for identifying corresponding parts with the numerals identifying the left hand combining unit 18 being primed. The detailed description is directed to the right hand combining unit 17, and it will be understood that this description also applies to the left hand combining unit 18.

The forward and reverse drive unit output drum 74 is connected to the ring gear 76 of the combining unit planetary gear set 78. Ring gear 76 meshes with a plurality of planetary pinions 79 journaled on an output carrier 81 which is connected to the right hand power train output shaft 82. The output shaft 82, in the case of tracklaying vehicles, would be drivingly connected to the right hand track. The other input to combining gear set 78 is transmitted from the differential drive unit 19 via the sun gear 84 which meshes with pinions 79. A vehicle brake 85 is connected by the output carrier 81 to the power train output shaft 82 and is operable on engagement to retard the output shaft for vehicle braking.

The differential drive unit 19 which provides the second input to the output combining units 17 and 18 receives its input drive from the converter via a bevel gear 86 connected to an extension of the converter output shaft 31 extending beyond bevel gear 60. Gear 86 meshes with a bevel gear 88 mounted on sleeve shaft 89 surrounding cross shaft 58. Shaft 89 is connected to a spur gear 90 which meshes with an annular external tooth spur gear 91 connected to the carrier 92 of the differential drive unit 19. A plurality of bevel pinions 94 journalled on carrier 92 mesh with a right hand bevel gear 96 and a left hand bevel gear 98. Since the differential output gears 96 and 98 are connected in like manner to the output combining units 17 and 18, respectively, like numerals are employed for identifying corresponding parts in the like drive connections with the numerals identifying the parts in the left hand drive connections being primed. The detailed description is directed to the right hand drive connection and it will be understood that this description also applies to the left hand drive connection. Gear 96 is connected to a differential output shaft or half shaft 99 which is connected to a spur gear 101 and the hub 102 of a steer friction brake 104. Gear 101 meshes with a larger spur gear 106 which is connected by a sleeve shaft 108 surrounding output shaft 82 to the sun gear 84. When one differential output shaft is retarded while the input differential carrier is being driven, the speed of the other differential output shaft is increased by the same amount of speed decrease of the retarded shaft and on holding one differential output shaft stationary, the speed of the other differential output shaft is doubled.

The brakes and clutches employed in the power train are conventional friction engaging devices and may be selectively actuated in any known way, i.e., electrically, hydraulically, pneumatically, or by some mechanical provision, and in a certain sequence. The preferred sequence of operation is described in the following illustrative operational summary.

The power train may be operated to propel the vehicle in straight-line motion by driving the power train output shafts at equal speeds in three forward drive ranges and three reverse drive ranges. In addition, the power train may be operated in each drive range to provide a differential steer, which is particularly suitable for land vehicle operation, and a geared steer as a main steer bias with the availability of the differential steer to modify the geared steer, which is particularly suitable for water vehicle operation.

The low straight-forward drive range, which is the lowest forward drive range and provides the greatest speed reduction and torque multiplication, is obtained by engaging the range unit low brake 49 and conditioning both forward and reverse drive units 14 and 16 to provide their forward speed ratio drive by engagement of their respective forward drive clutches 68 and 68'. The output combining gear units' ring gears 76 and 76' are driven in the forward direction in their lowest speed range while at the same time the output combining units' sun gears 84 and 84' are driven in the reverse direction by the converter driven differential unit 19 to thereby drive the power train output shafts 82 and 82' in the forward direction at the same speed and at a speed less than converter output shaft 31. Thus, the low straight-forward propulsion drive to the power train output shafts is made up of two components combined by the output combining units, i.e., a component drive to the combining units' ring gears 76 and 76', which component is determined by their respective forward and reverse drive units and the series arranged range unit and a component drive to the combining units' sun gears 84 and 84', which component is determined by the differential drive intermediate the converter output shaft 31 and these sun gears. The differential drive component is negative so that it subtracts from the forward speed ratio drives to the ring gears 76 and 76' and adds to the reverse speed ratio drives provided by the forward and reverse drive units 14 and 16. Thus, the overall power train drive ratios in low forward and also in the two higher forward drives, discussed later, are modified by the presence of this negative component and have a wider speed ratio spread than the speed ratios of the individual combining units.

Two higher straight-forward drive ranges are obtained by driving the combining units' ring gears 76 and 76' at higher forward speeds by operation of range unit 12 while the forward speed ratio drives in the forward and reverse drive units are maintained and the combining units' sun gears continue to operate in the same speed range. For a shift from the low to an intermediate forward drive range, the low brake 49 in range unit 12 is disengaged and the intermediate brake 54 is engaged to provide the intermediate speed ratio drive to the ring gears 76 and 76' for increased power train output shaft speed. For a shift from the intermediate to a high straight-forward drive range, the intermediate brake 54 is released and the high clutch 56 is engaged.

A similar sequence of operation of range unit 12 provides low, intermediate, and high straight-reverse drive ranges to power the output shafts in the reverse direction on disengagement of the forward drive clutches 68 and 68' and engagement of the reverse drive brakes 75 and 75' in the forward and reverse drive units 14 and 16, respectively. It will be recalled that the forward drive from the cross shaft 58 to the output combining ring gears is a 1:1 speed ratio drive while the reverse drive provided by these units is a reduction drive and that the drive from the differential unit 19 to the output combining sun gears is in the reverse direction to compensate for this difference in the forward and reverse drive ratios of units 14 and 16. The speed ratio provided by the differential drive train between the converter output shaft 31 and the output combining units' sun gears 84 and 84' is determined so that the overall power train reverse drive ratios in low, intermediate and high are equal to those in the forward drive ranges for vehicles requiring the same degree of maneuverability in reverse as obtained in forward drive.

Describing now the different steers afforded by the power train, it will first be observed that in the straightforward and straight-reverse drive ranges, the sun gears of the output combining units are driven at the same speed by the converter output shaft through the differential gearing so that the power train output shafts rotate at the same speed. Differential steer in each drive range in the forward and reverse, is provided by alternately retarding the differential half shafts 99 and 99' by operating their respective steer brakes 104 and 104'. For example, in any of the forward drive ranges and on engagement of the right hand steer brake 104 to effect a left vehicle turn, the negative speed component of the right hand output combining unit sun gear 84 is decreased resulting in increased forward speed of the right hand power train output shaft 82 while at the same time the negative speed component of the output combining unit sun gear 84' is correspondingly increased resulting in decreased forward speed of the left hand power train output shaft 82'. When the speed of sun gear 84 reaches zero, the negative speed component of sun gear 84' reaches double its normal speed to provide the smallest radius turn. A right vehicle turn with this type of steering operation is provided in each forward drive range by engaging the left hand steer brake 104', while the right hand steer brake 104 remains disengaged.

For steering in the reverse drive ranges and recognizing that the speed components to the output combining units' sun gears are negative like in the forward drive ranges, the speed of the right hand power train output shaft 82 will be increased at the same rate and by the same amount as the speed of the left hand output power train output shaft 82' is decreased on engagement of the left steer brake 104' while a turn in the opposite direction is obtained by engagement of the right hand steer brake 104. It has been found that this steer system is particularly suitable for land operation.

For water vehicle operation, the individual forward and reverse drives to the output combining units' ring gears 76 and 76' are used to provide the main steer bias which is a geared type of steer system. For example, in either the forward or reverse low, intermediate and high drive ranges, the vehicle may be steered by alternately changing the forward and reverse unit drive to the output combining units' ring gears 76 and 76' from forward to reverse drive in the case of straight-forward drive and from reverse drive to forward drive in the case of straight-reverse drive. The direction of the speed component of the output combining unit ring gear being controlled is thus reversed from its normal direction thereby effecting a change in the normal relative speed difference between the ring gear being controlled and its associated sun gear and causing a change in the speed of the power train output shaft driven by these gears. In addition, the main steer bias for water vehicle operation may be increased to provide a smaller radius of turn in all drive ranges by alternate supply of the differential steer brakes 104 and 104'. For example, the main steer bias for water vehicle operation to provide a right vehicle turn in the low forward drive range is established by disengaging the right hand forward drive clutch 68 and engaging the right hand reverse drive brake 75 to drive the right hand output combining unit ring gear 76 in the reverse direction while the left hand output combining unit ring gear 76' continues to be driven in the forward direction. Thus, the speed of the left hand power train output shaft is maintained and the speed of the right hand power train output shaft is decreased. Then, on engagement of the left hand differential steer brake 104', the left hand output combining unit sun gear 84' is brought to rest from its previous negative drive direction and the differential unit 19 operates to double the speed of the right hand output combining unit sun gear 84 in the reverse direction, resulting in a tighter turn, i.e., a smaller radius turn.

The above described preferred embodiment is illustrative of the invention and may be modified within the scope of the appended claims.

I claim:
1. In a power train the combination of an input shaft; a pair of output shafts; a pair of forward and reverse drive units, each operable to provide a forward and reverse speed ratio drive; a drive train operatively connecting said input shaft to said forward and reverse drive units; differential drive means operatively connected to said input shaft; and a pair of output combining units, each operatively connecting said differential drive means and one forward and reverse drive unit to one output shaft.

2. The power train set forth in claim 1 and said drive train including a unidirectional multispeed unit.

3. The power train set forth in claim 1 and said differential drive means having a pair of differential output drive brakes each operable to brake the differential drive to one output combining unit.

4. The power train set forth in claim 1 and each said forward and reverse drive unit comprising a direct drive clutch operable to establish said forward speed ratio drive and a reverse planetary gear set having an input sun gear, an output ring gear, a carrier having a pinion meshing with said sun and ring gear and a brake operable to retard said carrier to establish said reverse speed ratio drive.

5. The power train set forth in claim 4 and said differential drive means comprising a pair of output gears and an input carrier having a pinion meshing with said output gears.

6. The power train set forth in claim 1 and each said output combining unit comprising an input ring gear connected to be driven by one forward and reverse drive unit, an input sun gear connected to be driven by said differential drive means and an output carrier having a pinion meshing with said sun and ring gear.

7. The power train set forth in claim 1 and said drive train including a unidirectional multispeed unit connected to drive a cross shaft, and each said forward and reverse drive unit comprising a sun gear connected to said cross shaft, a ring gear connected to one output combining unit, a carrier having a pinion meshing with said sun and ring gear, a brake operable to retard said carrier to establish said reverse speed ratio drive, a clutch operable to directly connect said cross shaft to one output combining unit to establish said forward speed ratio drive.

8. The power train set forth in claim 1 and said differential drive means providing reverse speed ratio drives to said output combining units.

References Cited
UNITED STATES PATENTS

| | | | |
|---|---|---|---|
| 1,991,094 | 2/1935 | Higley | 74—720.5 X |
| 2,377,354 | 6/1945 | Merritt | 74—720.5 X |
| 2,689,489 | 9/1954 | Storer et al. | 74—710.5 |
| 2,930,257 | 3/1960 | Christenson | 74—720.5 |
| 3,044,320 | 7/1962 | Oudry | 74—710.5 |
| 3,137,182 | 6/1964 | Berchtold et al. | 74—720.5 |

FRED C. MATTERN, Jr., *Primary Examiner.*
ARTHUR T. McKEON, *Assistant Examiner.*